United States Patent
Weber

(10) Patent No.: US 7,604,297 B2
(45) Date of Patent: Oct. 20, 2009

(54) ADJUSTING MECHANISM AND VEHICLE SEAT

(75) Inventor: Frank Weber, Odenthal (DE)

(73) Assignee: Johnson Controls GmbH, Burscheid (DE)

(*) Notice: Subject to any disclaimer, the term of this patent is extended or adjusted under 35 U.S.C. 154(b) by 238 days.

(21) Appl. No.: 11/664,315

(22) PCT Filed: Sep. 21, 2005

(86) PCT No.: PCT/EP2005/010191

§ 371 (c)(1),
(2), (4) Date: Mar. 30, 2007

(87) PCT Pub. No.: WO2006/037470

PCT Pub. Date: Apr. 13, 2006

(65) Prior Publication Data

US 2008/0122281 A1  May 29, 2008

(30) Foreign Application Priority Data

Oct. 1, 2004 (DE) .................. 10 2004 048 349

(51) Int. Cl.
*B60N 2/02* (2006.01)
(52) U.S. Cl. ............... 297/367; 297/378.12; 297/378.1
(58) Field of Classification Search ............. 297/367, 297/378.12, 378.1
See application file for complete search history.

(56) References Cited

U.S. PATENT DOCUMENTS

| 4,629,251 | A  | * | 12/1986 | Tezuka ..................... 297/362 |
| 5,249,840 | A  | * | 10/1993 | Hoshihara et al. ...... 297/378.12 |
| 6,273,508 | B1 | * | 8/2001  | Lange .................... 297/378.12 |
| 6,540,232 | B2 | * | 4/2003  | Hansel et al. ............... 277/367 |
| 6,666,515 | B2 | * | 12/2003 | Asano et al. ................ 297/366 |
| 7,000,992 | B2 | * | 2/2006  | Armbrust et al. ....... 297/378.11 |
| 7,287,814 | B2 | * | 10/2007 | Heimann et al. ............ 297/367 |
| 2002/0089224 | A1 | * | 7/2002 | Bruck et al. .......... 297/378.11 |
| 2006/0181130 | A1 |   | 8/2006 | Kienke et al. |

FOREIGN PATENT DOCUMENTS

| DE | 195 22 854 A1 | 1/1997 |
| DE | 198 45 698 A1 | 4/2000 |
| DE | 103 12 136 A1 | 10/2004 |
| EP | 1 291 236 A2 | 3/2003 |

\* cited by examiner

*Primary Examiner*—Laurie K Cranmer
(74) *Attorney, Agent, or Firm*—Foley & Lardner LLP

(57) ABSTRACT

An adjusting mechanism includes a first sub-assembly, a bolt disposed on the first sub-assembly and a second sub-assembly. The bolt is configured to receive a force in a radial direction relative to an axis of the bolt. The second sub-assembly is mounted so as to be rotatable relative to the first sub-assembly by means of the bolt. The rotatability of the second sub-assembly relative to the first sub-assembly is configured to be reduced by a positive connection created using plastic deformation between the bolt and at least one of the first sub-assembly and the second sub-assembly.

18 Claims, 2 Drawing Sheets

ADJUSTING MECHANISM AND VEHICLE SEAT

CROSS-REFERENCE TO RELATED PATENT APPLICATIONS

The present application is a National Stage of International Application No. PCT/EP2005/010191 filed on Sep. 21, 2005, which claims the benefit of German Patent Application No. DE 10 2004 048 349.3 filed on Oct. 1, 2004. The entire disclosures of International Application No. PCT/EP2005/010191 and German Patent Application No. DE 10 2004 048 349.3 are incorporated herein by reference.

BACKGROUND

The present disclosure relates to a recliner or adjusting mechanism. More particularly, the present disclosure relates to a recliner or adjusting mechanism for adjusting the inclination of the backrest of a vehicle seat.

German Publication No. DE 198 45 698 A1 discloses an adjusting mechanism for adjusting the inclination of the backrest of a vehicle seat. The disclosed adjusting mechanism consists of a first fixing plate rotatably connected to a second fixing plate. The first fixing plate is connected to the backrest, while the second fixing plate is disposed on the seat part. A circular-arc-shaped peripheral region of the second fixing plate is provided with a toothed portion with which a latching pawl, which is rotatably mounted on the first fixing plate, may be brought into engagement. As a result of this engagement, which may be released for the adjustment, the angular position between the backrest and seat part may be fixed. A locking cam, also rotatably disposed by means of a bolt on the first fixing plate, prevents undesirable unlocking of the latching pawl. Both in normal use, but especially under overload due to an accident, a force acts on the bolt in a radial direction relative to the axis of rotation of the locking cam. In this connection, a structural load limit is preset, up to which the clamping force of the locking cam is maintained and thus the backrest remains fixed in its set position.

There continues to remain a need to improve the safety of a generic adjusting mechanism, such as the one detailed above, at low cost.

SUMMARY

One exemplary embodiment relates to an adjusting mechanism including a first sub-assembly, a bolt disposed on the first sub-assembly and a second sub-assembly, which is mounted so as to be rotatable by means of the bolt. The bolt is configured to receive a force in a radial direction relative to an axis of the bolt. Rotation of the second sub-assembly relative to the first sub-assembly is reduced by a positive connection between the bolt and at least one of the first sub-assembly and the second sub-assembly. According to one exemplary embodiment, the positive connection results from plastic deformation.

Another exemplary embodiment relates to a recliner mechanism for adjusting the inclination of a backrest of a vehicle seat relative to a seat part. The recliner mechanism includes a first fixing plate configured to be connected to the backrest and a second fixing plate configured to be connected to the seat part and having a toothed portion. The first fixing plate is rotatable relative to the second fixing plate. The recliner mechanism also includes a latching pawl, a bolt and a locking cam. The pawl is rotatably mounted on the first fixing plate and configured to engage the toothed portion of the second fixing plate for locking the first fixing plate relative to the second fixing plate. The bolt is connected fixedly in terms of rotation to the first fixing plate. The locking cam is rotatably supported by the bolt for holding the latching pawl in engagement with the toothed portion. When a load applies a predetermined a radial force to the locking cam, rotation of the locking cam relative to the first fixing plate is reduced by a positive connection between the bolt and the locking cam. The positive connection is created by plastic deformation of one of the bolt and the locking cam against the other of the bolt and the locking cam.

Another exemplary embodiment relates to a vehicle seat including a backrest, a seat part and a recliner mechanism for adjusting the inclination of the backrest relative to the seat part. The recliner mechanism includes a first fixing plate connected to the backrest, a second fixing plate connected to the seat part, a latching pawl rotatably mounted on the first fixing plate and configured to engage the second fixing plate for locking the first fixing plate relative to the second fixing plate, a bolt connected fixedly in terms of rotation to the first fixing plate and a locking cam rotatably supported by the bolt for holding the latching pawl in engagement with the second fixing plate. A positive connection created using plastic deformation between the bolt and the locking cam reduces the rotatability of the locking cam relative to the first bolt when an overload force is applied in a radial direction relative to an axis of rotation of the locking cam.

Another exemplary embodiment relates to a vehicle seat including a backrest, a seat part and a recliner mechanism for adjusting the inclination of the backrest relative to the seat part. The recliner mechanism includes first and second sub-assemblies that move relative to one another during recline of the backrest relative to the seat part and a bolt that connects the first sub-assembly to the second sub-assembly and that is configured to receive a force in a radial direction relative to an axis of the bolt. When the force reaches a predetermined value, movement of the first sub-assembly relative to the second sub-assembly is restricted by a positive connection between the bolt and one of the first and second sub-assemblies due to plastic deformation of the bolt against one of the first and second sub-assemblies.

BRIEF DESCRIPTION OF THE DRAWINGS

The figures show, by way of example and schematically, an exemplary embodiment, in which.

DETAILED DESCRIPTION

According to an exemplary embodiment, a recliner or adjusting mechanism includes a first sub-assembly and a second sub-assembly. The rotatability of the second sub-assembly relative to the first sub-assembly may be reduced with the aid of a positive connection between a bolt and the first sub-assembly and/or the second sub-assembly, which may be created using plastic deformation. An overload due to an accident, which essentially attempts to unlock the adjusting mechanism, thus simultaneously initiates (irreversible) means which counteract this unlocking.

According to an exemplary embodiment, the bolt may be connected fixedly in terms of rotation to the first sub-assembly, and the positive connection may be created between the bolt and the second sub-assembly. According to various alternative embodiments, the bolt may be connected fixedly in terms of rotation to the second sub-assembly and to create the positive connection between the bolt and the first sub-assembly.

According to an exemplary embodiment, the positive connection is created by the bolt being rotatably mounted in a hole, which is at least partially toothed on its inner circumference, in the first or second sub-assembly. In this connection, the inner circumference of the hole advantageously has, at least in the region of the toothed portion, a greater hardness than the outer circumference of the bolt. When the overload occurs, the teeth dig into the bolt and prevent the rotation thereof relative to the hole. Under normal working load, however, the rotational movement is uninterrupted. Moreover, it is possible, in principle, to unlock the adjusting mechanism again after the overload has subsided, for example to allow vehicle passengers to leave the vehicle by folding forward the backrest.

According to an exemplary embodiment, the toothed portion is disposed in a segment of the inner circumference of the hole. The force application point of the force F under overload is disposed approximately centrally on the circular arc thereof. In such an embodiment, the toothed segment extends on either side of the force application point, advantageously over an angle of less than 45°, preferably approximately 30°. In this angular range, the toothed portion deploys its greatest effect.

According to an exemplary embodiment, the adjusting mechanism is a locking mechanism for adjusting the inclination of the backrest of a motor vehicle seat, the first sub-assembly being a first fixing plate connected to the backrest and the second sub-assembly being a locking cam, by means of which a latching pawl rotatably mounted on the first fixing plate may be held in engagement with the toothed portion of a second fixing plate which may be pivoted relative to the first fixing plate.

Figure 1:
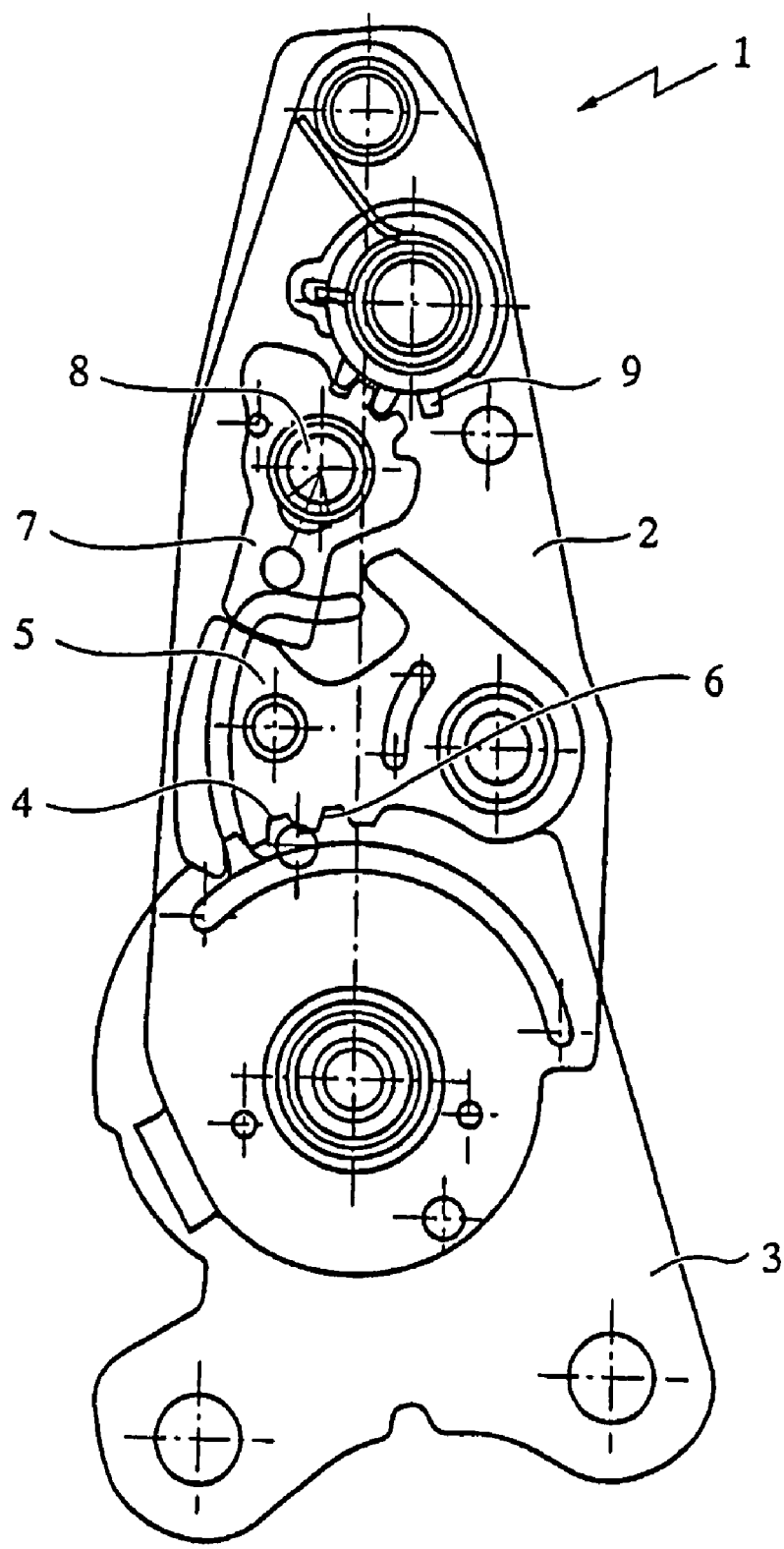
FIG. 1 is a side view of a mechanism for adjusting the inclination according to an exemplary embodiment.

Referring to FIG. 1, the adjusting mechanism 1 includes a first fixing plate 2 for attaching to the backrest, not shown, as well as a second fixing plate 3 for fixing to the seat part of the vehicle seat, also not shown. The second fixing plate 3 is partially provided on its outer periphery with a toothed portion 4. The adjusting mechanism 1 also includes a latching pawl 5 rotatably disposed on the first fixing plate 2 (the first sub-assembly) and has a counter toothed portion 6. The counter toothed portion 6 of the latching pawl 5 may be brought into positive engagement with the toothed portion 4 of the second fixing plate 3. The adjusting mechanism 1 further includes a locking cam 7 (the second sub-assembly) pivotally mounted on a rigid bolt 8 projecting from the first fixing plate 2. The locking in the locked position, as well as the unlocking, of the latching pawl 5 are carried out by the locking cam 7. The locking cam 7 is driven by a toothed member 9. With regard to the function of such adjusting mechanisms, reference is made expressly to the aforementioned German Publication No. DE 198 45 698 A1, and with regard to the configuration of the toothed member 9, reference is made to the, as yet unpublished, German Patent Application No. DE 103 12 136.6-16.

Figure 2:
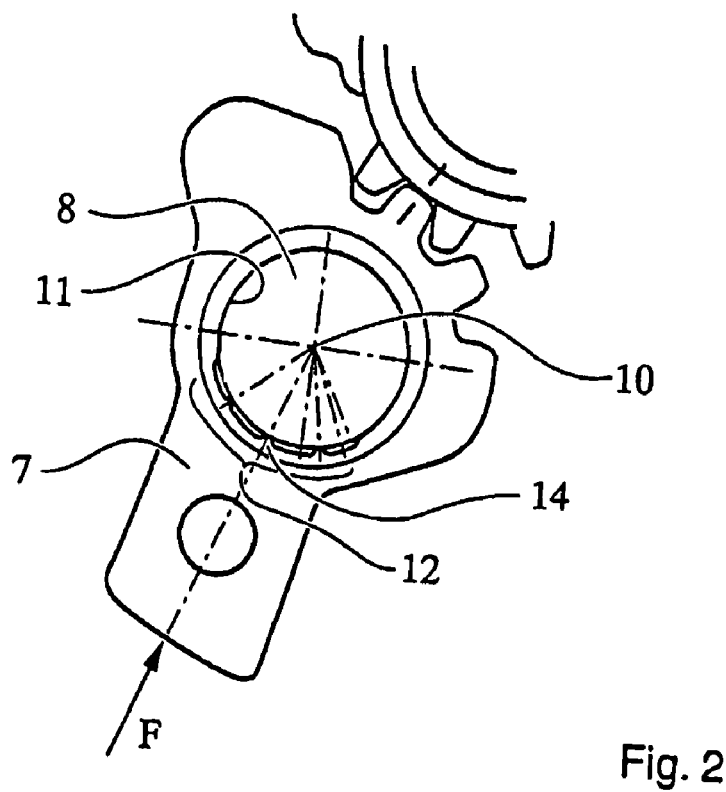
FIG. 2 is an enlarged side view of a locking cam of the mechanism of FIG. 1 according to an exemplary embodiment.

Referring to FIG. 2, during normal use, and under overload due to an accident in particular, a force F, which is diverted into the first fixing plate 2 via the bolt 8, is already applied to the locking cam 7 in a radial direction relative to the axis of rotation 10 of the locking cam 7. The hole 11 inserted into the locking cam 7, into which the bolt 8 is pushed, is provided with a toothed portion 13 in a segment 12 of its inner circumference. The segment 12 extends on either side of the direction of the force application point 14 in the transition between the bolt 8 and the locking cam 7 over an angle $\alpha$ of respectively 30°.

Figure 3:
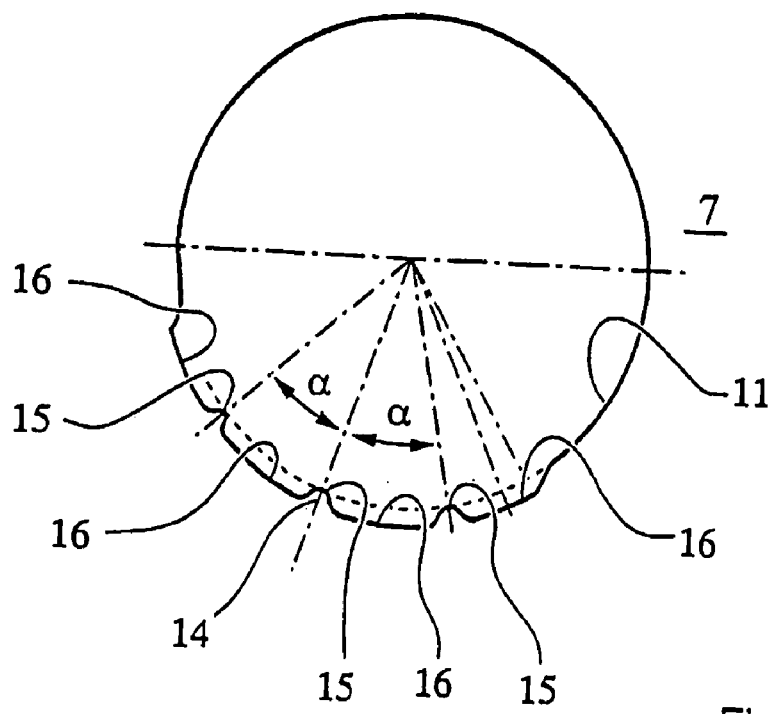
FIG. 3 is a further enlarged side view of a toothed portion of the locking cam of FIG. 2 according to an exemplary embodiment.

As is visible from FIG. 3, the individual teeth 15 are formed by recesses 16 on the other side of the inner circumference of the hole 11, i.e. not projecting therein. Thus, during normal use, the rotatability of the locking cam 7 on the bolt 8 is not hindered. If, however, the radial force F exceeds a normal amount, the relatively hard teeth 15 dig into the outer circumference of the relatively soft bolt 8 and act against a rotation of the locking cam 7 by means of a positive connection. Undesirable unlocking of the system is counteracted thereby.

The invention claimed is:

1. An adjusting mechanism comprising:
    a first sub-assembly;
    a bolt disposed on the first sub-assembly to receive a force in a radial direction relative to an axis of the bolt; and
    a second sub-assembly rotatable relative to the first sub-assembly via the bolt,
    wherein rotation of the second sub-assembly relative to the first sub-assembly is configured to be restricted by a connection between the bolt and at least one of the first sub-assembly and the second sub-assembly,
    wherein the bolt is rotatably mounted in a hole defined by one of the first sub-assembly and the second sub-assembly, an inner circumference of the hole being at least partially toothed, and
    wherein the inner circumference of the hole has, at least in the region of the toothed portion, a greater hardness than an outer circumference of the bolt.

2. The adjusting mechanism of claim 1 wherein the bolt is connected fixedly in terms of rotation to the first sub-assembly and the connection between the bolt and at least one of the first sub-assembly and the second sub-assembly is created between the bolt and the second sub-assembly.

3. The adjusting mechanism of claim 1 wherein the toothed portion is disposed in a segment of the inner circumference of the hole, a force application point of the force under overload being disposed approximately centrally on the circular arc of the segment.

4. The adjusting mechanism of claim 3 wherein the toothed segment extends on either side of the force application point of the force over an angle of less than 45 degrees.

5. The adjusting mechanism of claim 4 wherein the toothed segment extends on either side of the force application point of the force over an angle of approximately 30 degrees.

6. The adjusting mechanism of claim 1 wherein the connection between the bolt and at least one of the first sub-assembly and the second sub-assembly results from plastic deformation of the bolt relative to one of the first sub-assembly and the second sub-assembly.

7. A recliner mechanism for adjusting the inclination of a backrest of a vehicle seat relative to a seat part, the recliner mechanism comprising:
    a first fixing plate configured to be connected to the backrest;
    a second fixing plate configured to be connected to the seat part and having a toothed portion, the first fixing plate being rotatable relative to the second fixing plate;
    a latching pawl rotatably mounted on the first fixing plate and configured to engage the toothed portion of the second fixing plate for locking the first fixing plate relative to the second fixing plate;

a bolt connected fixedly in terms of rotation to the first fixing plate; and a locking cam rotatably supported by the bolt for holding the latching pawl in engagement with the toothed portion, wherein, when a load applies a predetermined radial force to the locking cam, rotation of the locking cam relative to the first fixing plate is configured to be restricted by a connection between the bolt and the locking cam, and wherein the connection is created by plastic deformation of one of the bolt and the locking cam against the other of the bolt and the locking cam.

8. The recliner mechanism of claim 7 wherein the locking cam includes an inner circumference defining a hole configured to receive the bolt, the inner circumference having a toothed portion.

9. The recliner mechanism of claim 8 wherein the toothed portion of the inner circumference has a greater hardness than an outer circumference of the bolt.

10. The recliner mechanism of claim 9 wherein the toothed portion of the inner circumference digs into the outer circumference of the bolt to provide the connection created using plastic deformation.

11. The recliner mechanism of claim 10 wherein the toothed portion of the inner circumference is limited to a segment of the inner circumference.

12. The recliner mechanism of claim 11 wherein the segment extends on both sides of an application point of the radial force over an angle of less than 45 degrees.

13. The recliner mechanism of claim 12 wherein the segment extends on both sides of the application point over an angle of approximately 30 degrees.

14. A vehicle seat comprising:

a backrest and a seat part;

a recliner mechanism for adjusting the inclination of the backrest relative to the seat part, the recliner mechanism comprising:

a first fixing plate connected to the backrest;

a second fixing plate connected to the seat part;

a latching pawl rotatably mounted on the first fixing plate and configured to engage the second fixing plate for locking the first fixing plate relative to the second fixing plate;

a bolt connected fixedly in terms of rotation to the first fixing plate; and a locking cam rotatably supported by the bolt for holding the latching pawl in engagement with the second fixing plate, wherein a connection created using plastic deformation between the bolt and the locking cam reduces the rotatability of the locking cam relative to the bolt when an overload force is applied in a radial direction relative to an axis of rotation of the locking cam.

15. The vehicle seat of claim 14 wherein the locking cam includes an inner circumference defining a hole configured to receive the bolt, the inner circumference having a toothed portion that has a greater hardness than an outer circumference of the bolt.

16. The vehicle seat of claim 15 wherein the toothed portion of the inner circumference digs into the outer circumference of the bolt to provide the connection created using plastic deformation.

17. The vehicle seat of claim 16 wherein the toothed portion of the inner circumference is limited to a segment of the inner circumference.

18. The vehicle seat of claim 17 wherein the segment extends on both sides of an application point of the radial force over an angle of less than 45 degrees.

* * * * *